United States Patent
Scholz (10) Patent No.: US 8,589,492 B2
(45) Date of Patent: Nov. 19, 2013

(54) ELECTRONIC MESSAGE OBJECT DROP FEATURE

(75) Inventor: Martin Scholz, Nussloch (DE)

(73) Assignee: SAP AG, Walldorf (DE)

( * ) Notice: Subject to any disclaimer, the term of this patent is extended or adjusted under 35 U.S.C. 154(b) by 1924 days.

(21) Appl. No.: 10/837,313

(22) Filed: Apr. 30, 2004

(65) Prior Publication Data

US 2005/0246721 A1   Nov. 3, 2005

(51) Int. Cl.
*G06F 15/173* (2006.01)

(52) U.S. Cl.
USPC ............................................ 709/206; 725/53

(58) Field of Classification Search
USPC .......................................................... 709/206
See application file for complete search history.

(56) References Cited

U.S. PATENT DOCUMENTS

| | | | | |
|---|---|---|---|---|
| 5,944,787 A | * | 8/1999 | Zoken ........................... | 709/206 |
| 2004/0107193 A1 | * | 6/2004 | Tremblay ......................... | 707/3 |
| 2004/0133645 A1 | * | 7/2004 | Massanelli et al. ........... | 709/206 |

OTHER PUBLICATIONS

Cardoza, Patricia. Special Edition Using Microsoft Office Outlook 2003. Que, Sep. 25, 2003.*
Slovak, Ken. Absolute Beginner's Guide to Microsoft Office Outlook 2003. Que, Oct. 1, 2003.*
Murray et al. Introduction to Microsoft Outlook 2003 Mail. http://www.officetutorials.com. Sep. 2003.*
http://msdn.microsoft.com/library/en-us/e2k3/e2k3/_techsel_tech_13.asp?frame=true, "Messaging Application Programming Interface (MAPI)," 2 pages, printed from the internet on Apr. 8, 2004.
*The Windows Interface Guidelines for Software Design*, "Direct Manipulation Method," pp. 77-87.
*Drag-and-Drop*, Part IV: The Interaction, pp. 247-267.

* cited by examiner

*Primary Examiner* — William Goodchild
(74) *Attorney, Agent, or Firm* — Finnegan, Henderson, Farabow, Garrett & Dunner, L.L.P.

(57) ABSTRACT

A user is aided in using an application program. A method may include receiving an input in a computer system upon a user dropping an electronic message object in a graphical user interface of an application program. Upon receiving the input, an information portion is extracted from the electronic message object. An operation is performed in the application program with the extracted information portion as a parameter, wherein the electronic message object is not stored in association with the application program. When the performed operation includes a data repository query, a learning function or an ambiguity-resolving feature may be used.

18 Claims, 6 Drawing Sheets

# ELECTRONIC MESSAGE OBJECT DROP FEATURE

TECHNICAL FIELD

This description relates to a user dropping an electronic message object in an application program.

BACKGROUND

Many software application programs require a user to perform one or more operations to obtain a specific output from the program. Such operations are often aided by features shown in a graphical user interface (GUI) for the application program. To search a database, for example, the user typically has to type a query into a search field and click a button to execute the search. To create a new record in a database, the user typically has to provide a name for the record and click a button to execute the creation and saving of the new record. Other software-based operations may require the user to make different kinds of inputs.

A common situation in today's office environment is that a user has access to a business-specific program such as a database management program that contains records used in the daily activities of the office. In addition, the user often has access to an application program that handles electronic messages, e.g., an email program. The user may receive emails from persons who have questions or other issues that require use of the business-specific program. When receiving such an email, the user typically launches the business-specific program or switches to a separate window where it is running, reviews or creates a particular record therein, and thereafter returns to the email program to respond to the sender. The user may have to make a certain entry in the business-specific program to locate (or create) the sought record, and this entry often relates to the sender of the email or to information contained in the email.

The task of using a keyboard to enter information can be tedious for the user, particularly if the user is charged with performing a similar operation many times a day. Also, manually typing characters in input fields can lead to errors, especially when the task is repetitive for the user. Moreover, it may be disruptive if the user after typing must move her hand from the keyboard to a pointing device to click a button that initiates the desired operation.

SUMMARY

The invention relates to aiding a user in using an application program. In a first general aspect, a method comprises receiving an input in a computer system upon a user dropping an electronic message object in a graphical user interface of an application program. Upon receiving the input, an information portion is extracted from the electronic message object. An operation is performed in the application program with the extracted information portion as a parameter. The electronic message object is not stored in association with the application program.

In selected embodiments, performing the operation may comprise storing the extracted information portion. In selected embodiments, performing the operation may comprise creating a record in the computer system, the record being associated with the extracted information portion. In selected embodiments, performing the operation may comprise opening a record stored in the computer system that is associated with the extracted information portion. In selected embodiments, performing the operation may comprise using the extracted information portion in searching a data repository.

In a second general aspect, a graphical user interface comprises a drop area where a user can drop an electronic message object to have an information portion be extracted from the electronic message object and an operation performed in the application program with the extracted information portion as a parameter. The electronic message object is not stored in association with the application program.

In selected embodiments, the drop area may extend throughout the graphical user interface. In selected embodiments, the drop area may not be visible.

In selected embodiments, the graphical user interface may comprise several drop areas. In embodiments with several drop areas, at least two of the several drop areas may correspond to extracting different categories of information portions from electronic message objects dropped in the at least two drop areas. In embodiments with several drop areas, at least two of the several drop areas may correspond to performing different operations in the application program.

Advantages of the systems and techniques described herein may include any or all of the following. Providing that a user can initiate performance of an operation in an application program by dropping an electronic message object therein. Providing a more efficient use of an application program that is not integrated with an email program. Aiding a user in responding to an email by providing that the user can conveniently enter the sender's name in another application program.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1A:
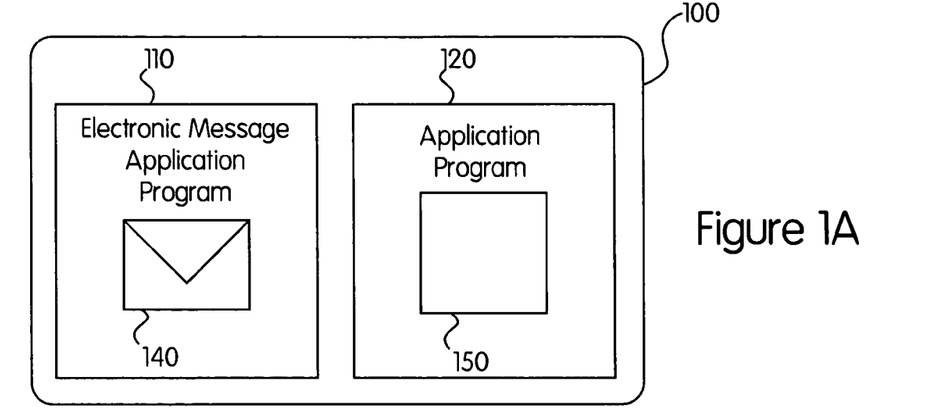
FIGS. 1A-C show an electronic message object being dropped in an exemplary GUI.
Figure 1B:
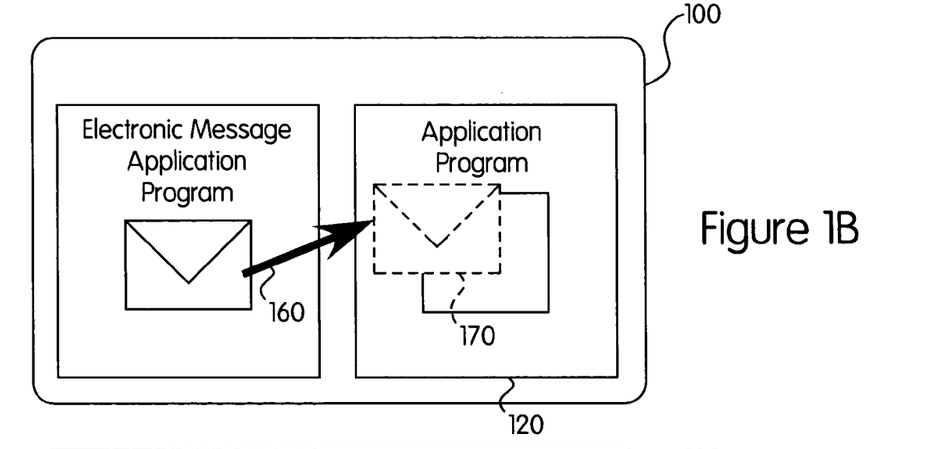
Figure 1C:
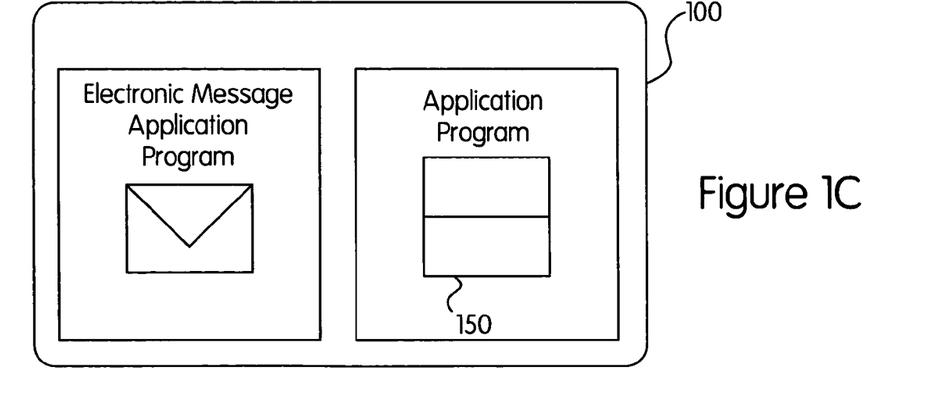

FIGS. 1A-C show separate instances of a GUI 100 that can be generated by a computer system (not shown). The GUI contains views of an electronic message application program 110 and another application program 120, such as a business-specific application program. The programs 110 and 120 may be executed in separate windows displayed on the GUI. The electronic message program contains an electronic message object 140. The electronic message application may handle any type of electronic message(s), such as email or text messages (also known as Short Message Service (SMS) messages). For example, the electronic message object 140 may be a received email that is located in an "Inbox" of the program 110.

The programs 110 and 120 support drag and drop technology. It will be described below that a user may drag an electronic message object and drop it on the program 120. This may trigger the system to extract an information portion from the electronic message object and perform an operation in the program 120 with the extracted information portion as a parameter. Unlike existing drag and drop features, the purpose of dropping the electronic message on the program 120 is not to persistently store it there but may be to have the specific operation performed in that program. Accordingly, the electronic message object is not stored in association with the program 120.

The program 120 includes displayed content 150 that relates to one or more operations that can be performed therein. For example, the displayed content may include a data repository search function and a display area for presenting results of a search.

Assume that the electronic message object 140 contains a question for the person that uses the GUI. The question may require the user to access a specific record available through the program 120 and review information stored in that record. For example, the electronic message object is sent to a Human Resources (HR) department of a company by an employee wondering about some aspect of her HR record.

The user drags the electronic message object on top of the GUI view of the program 120, as indicated in FIG. 1B by an arrow 160. This may involve the drag and drop technology supported by the programs 110 and 120. A phantom representation 170 of the electronic message object may be visible during the dragging. The user drops (releases) the electronic message object on top of the program 120. The program 120 is configured to recognize that an electronic message object is being dropped and to take specific action in response thereto. In this example, the entire GUI view of the program 120 is a potential drop target for dragged objects and the user therefore can drop the electronic message object anywhere on the program 120.

The user dragging and subsequent dropping the electronic message object creates a specific input in the computer system. Upon receiving the input, the system extracts an information portion from the electronic message object. For example, the system extracts the first and last name of the sender. The electronic message program is configured such that the "original" electronic message object 140 remains therein while the user performs the dragging indicated by arrow 160.

The system thereafter performs an operation in the program 120. This may involve a search in a data repository. For example, if the sender's first and last name are extracted from the electronic message object they may be used to query a data repository for a record associated with the sender. Results of the data repository query may be displayed subsequently. For example, in FIG. 1C the appearance of the content 150 has changed to conceptually indicate that the GUI now is presenting results of the performed operation.

In the HR example, then, the described features lets the user access the HR record of the person who sent the electronic message object by dragging that electronic message object onto the program 120. When the user is done reviewing the HR record, she can return to the electronic message program and respond to the received electronic message. Accordingly, FIGS. 1A-C show an example of the user accessing a record associated with the electronic message sender without typing that person's name or any other identifier in the program 120.

Figure 2:
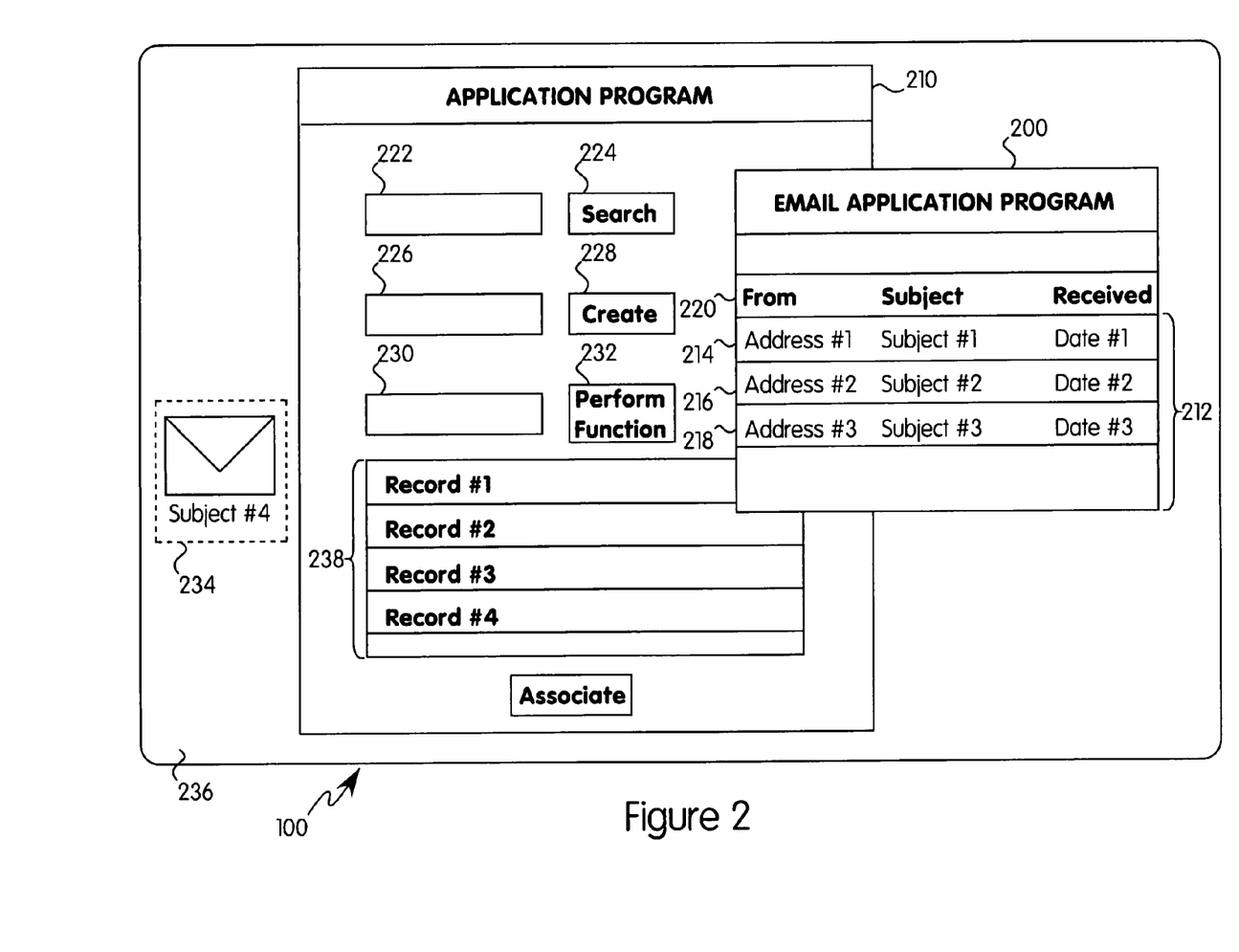
FIG. 2 shows an example of how an email object can be dropped.

FIG. 2 shows another example of the GUI 100 wherein an email application program 200 is an example of the electronic message program 110 and a business-specific application program 210 is an example of the program 120. For example, the programs 200 and 210 may be displayed in separate windows of the GUI 100. The GUI 100 may be displayed by any of several different devices including, but not limited to, a desktop computer, a laptop computer, a handheld computer, a personal digital assistant (PDA), and a cellular telephone.

The view of the email program 200 that is being displayed in the GUI 100 includes an email object presentation area 212 in which email objects 214, 216 and 218 are currently being displayed. For example, the area 212 is part of an "Inbox" function in the program 200. The email program may be capable of displaying any or all of the emails 214-218 in a separate window, for example if the user clicks on them in the area 212. Key data from emails listed in area 212 is currently displayed under respective "From," "Subject" and "Received" headings in a header bar 220.

The program 210 performs one or more business-specific operations, such as managing a data repository wherein company records are stored. In such implementations, program 210 may be the primary tool for an employee to access records stored in the data repository, and to create new records to be stored therein. Here, the program 210 includes a search function, a record creation function and another arbitrary function.

The search function includes an input field 222 and a "Search" input command 224. The user can search the associated data repository by entering a search term in the field 222 and selecting the command 224. Similarly, the function for creating a record includes an input field 226 and a "Create" input command 228. The user can create a new record in the data repository by entering a name for it in the field 226 and selecting the command 228. The third function may include additional features for the program 210, as schematically illustrated by the input field 230 and the associated "Perform Function" command 232. For example, this may involve updating an employment record for an identified email sender function. Here, only a simple example of the program 210 is shown for clarity, and in other implementations it may include many different and/or more sophisticated features.

The programs 200 and 210 support drag and drop functionality. Regarding the email program, a user can drag any email object presented in the area 212 and drop it in any location that is recognized as a drop target. Examples of such email programs include MICROSOFT OUTLOOK 2000 SR-1 and other Microsoft products. A user may drag an email object from the program 200 to store it in a specific location, for example as the user has here done with an email object 234 which is currently displayed as an icon on a desktop 236 in the GUI.

The program 210, in turn, is configured to support email objects being dragged on top of it in the GUI 100 and dropped. Particularly, when a user drags an email onto the program 210 without dropping it (e.g., without releasing a mouse button after the dragging), the program 210 may recognize that a drag and drop action is being performed. In response, the program may confirm that it is capable of being a target for drag and drop actions. In contrast, a program that does not support drag and drop may in the same situation generate a response that changes the pointer from an arrow to the familiar "Not available as a drop target" shape.

One or more drop areas may be included in the program 210. A drop area defines the portion(s) of the GUI representation of program 210 where an email object can be dropped. A drop area may be visible or invisible. A drop area may extend throughout the entire GUI representation of the program 210 or a portion thereof. For example, a drop area for searching the data repository may include the field 222 or the command 224 or both. Similarly, a drop area for creating a new record may include the field 226 or the command 228 or both, as another example.

Assume now that the user drags the email object 214 and drops it on the field 222 (or another portion of the program 210 designated as a drop area for searching the data repository). This creates a specific input that is recognized as a drag and drop action. In response to the input, an information portion is extracted from the email object 214. For example, the sender email address may be extracted. That is, the program 210 includes instructions for identifying the string of information in an email object that corresponds to the sender's email address and for extracting this information upon the email object being dropped.

Following the extraction, an operation is performed in the program 210 with the extracted information portion as a parameter. In this example, a search operation is performed to identify in the data repository containing the extracted email address records. The outcome of the performed operation (i.e., any hits in this example) may be presented in an area 238 of the program 210. Here, four records (labeled #1-4 in FIG. 1 for clarity) were found. Thus, the outcome of the performed operation may be the same as if the user had placed the mouse cursor (or insertion point) in the field 222, typed the sender's email address on a keyboard and then selected the command 224 using a mouse. However, all the user had to do in this example was drag the email object 214 and drop it on top of the program 210. This may simplify a user's task when a person sends an email that prompts the user to look up that person's record in a data repository.

Other functions than querying a data repository may be performed. For example, a new record may be created upon the user dropping an email object on the field 226 or the command 228 (or on any other area of the program 210 so defined). In such an implementation, the extracted information portion may be used as an identifier or name for the created record. Accordingly, performing the operation may involve storing the extracted information portion.

One or more categories of information may be extracted from email objects. For example, in the most recent example above where dropping the email object created a new record, it may be desirable to have the new record associated with the sender's first and last name rather than the sender's email address. Many emails include this information and it is often displayed in the email program where the email object is received. For example, the "From" column in this exemplary email program 200 lists the short form "Address #1," and so on, for the respective email objects instead of their corresponding sender email addresses.

It may be possible to find the sender first and last name in a listing of detailed information about a particular email. For example, by clicking the right mouse button in a Microsoft Outlook application one can view a "Message Options" screen for a selected email object. An "Internet headers" area of that screen may contain information categorized by various tags or subtitles, such as information on how the email was received, its subject line, its sender and recipient information, and so on. Accordingly, information categories, such the sender name, sender email address, a recipient name, a recipient electronic message address (optionally distinguished between "To:" recipients and "Cc:" recipients), contents from the subject line and/or message body or non-displayed content of the email object may be extracted. The information portion may be extracted using a technique that searches for a specific character string in the entire email object or in any portion(s) thereof. For example, an identifier that conforms to a special format can be located in the email object and be extracted therefrom.

If there is more than one drop area in the program 210, they may correspond to similar operations being performed. For example, there may be more than one drop area in the program 210 for searching the data repository. A drop area including either of the field 222 and the command 224, or both, may extract the sender email address for performing a search. In contrast, another drop area that may include either of the field 230 and the command 232, or both, may extract an identifier from the subject line for performing a search. Accordingly, at least two drop areas may correspond to extracting different categories of information from email objects.

Two or more drop areas in the program 210 may correspond to performing different operations. These different operations are sometimes performed using the same extracted information category from email objects. For example, a drop area including either of the field 222 and the command 224, or both, may extract the sender's first and last name for performing a search. Another drop area that includes either of the field 230 and the command 232, or both, may extract the sender's first and last name for creating a new record for the sender.

The user may drag an email object onto the program 210 using any suitable input device. For example, the user may use a mouse, pointing device, trackball or a data glove to perform this action. In implementations where the GUI 100 is generated on a touch screen or other touch sensitive surface, the user may use a finger, a stylus or any other suitable tool. In some embodiments, programs 200 and 210 may support drag and drop operations using arrow keys on a keyboard, as another example.

Any email object may be dragged directly from the email program to the program 210, such as if the user were to drag any of the emails 214-218 from their current location. An email object may be dragged from another location that is not associated with the email program. For example, the user may drag the email object 234 from the desktop 236 to the program 210.

In some situations, the information extracted for a search operation may not yield any hit in the data repository. For example, the sender's email address is extracted and used as a search parameter, but no record in the data repository is associated with it. It may then be possible to extract another category of information from the email object to search the data repository. For example, if the sender's email address yields no hit, the sender's first and last name may be used in searching. The extraction of the sender's name may be done before or after the first extracted information yields no hit. That is, more than one information category may be extracted as a backup in case one of them does not yield a hit (or yields multiple hits). Optionally, if using the sender's first and last name scores a hit, the data repository may be updated to include the sender's email address such that the record can thereafter be identified by extracting the email address for the search. Moreover, any system can be configured to permit such a "learned" association between an email address and a retrievable record to be deleted at the user's request, for example if the user realizes that the email address was inadvertently associated with the wrong record.

As another example, information extracted elsewhere may be used. For example, it is possible that the email program 200 includes information about senders and recipients of emails that are not necessarily included in the email objects themselves. For example, the email program may know the first and last name of the sender although this information is not included in the email object. In such situations, performing the operation (such as a data repository search) may involve accessing the email program 200 with a suitable interface. For example, it may be possible to access a Microsoft email program using the Messaging Application Programming Interface (MAPI) to extract information relating to an email that currently has focus in the email program. That is, the program 210 may be configured to extract information from the email program 200 using MAPI, and the extracted information may be used in the current operation.

The exemplary search described above yielded four hits (labeled #1-4 in area 238). In such a situation, the user may select any of the listed hits with a pointing device to view that record in its entirety. The system may include a learning function that registers which of the displayed records the user selects. Then, the data repository may be updated to provide that the selected record is the one displayed the next time the user drops an equivalent email object on the program 210. For example, the extracted information portion may be the sender's name and running a search on this name in the data repository yields the four hits #1-4 because there are four persons in the organization with the same name. After the user selects one of the records, the data repository may be updated to associate the sender's email address with the one of records #1-4 that the user selects.

Figure 3:
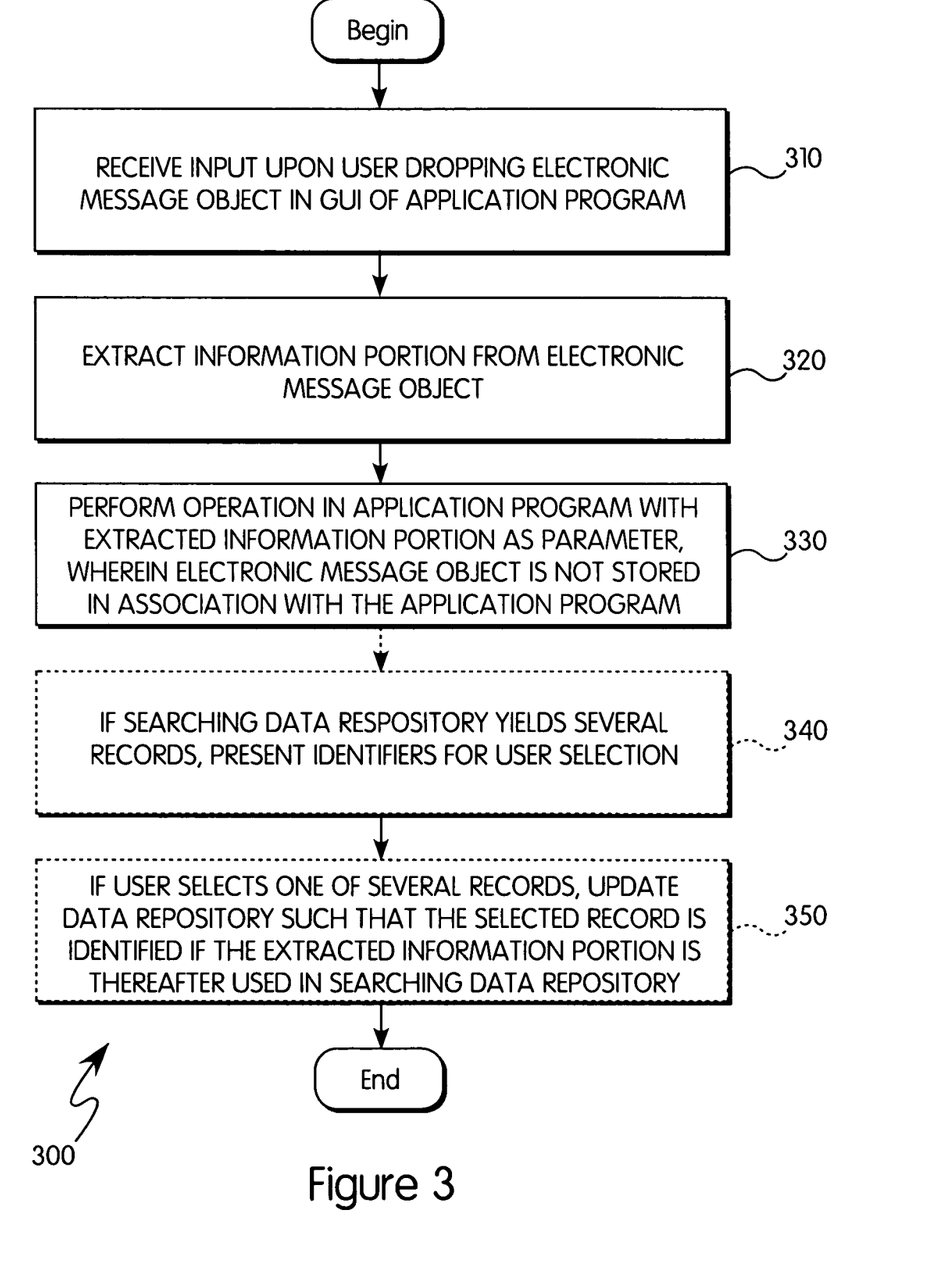
FIGS. 3, 4 and 5 are flow charts of embodiments of an inventive method.
Figure 4:
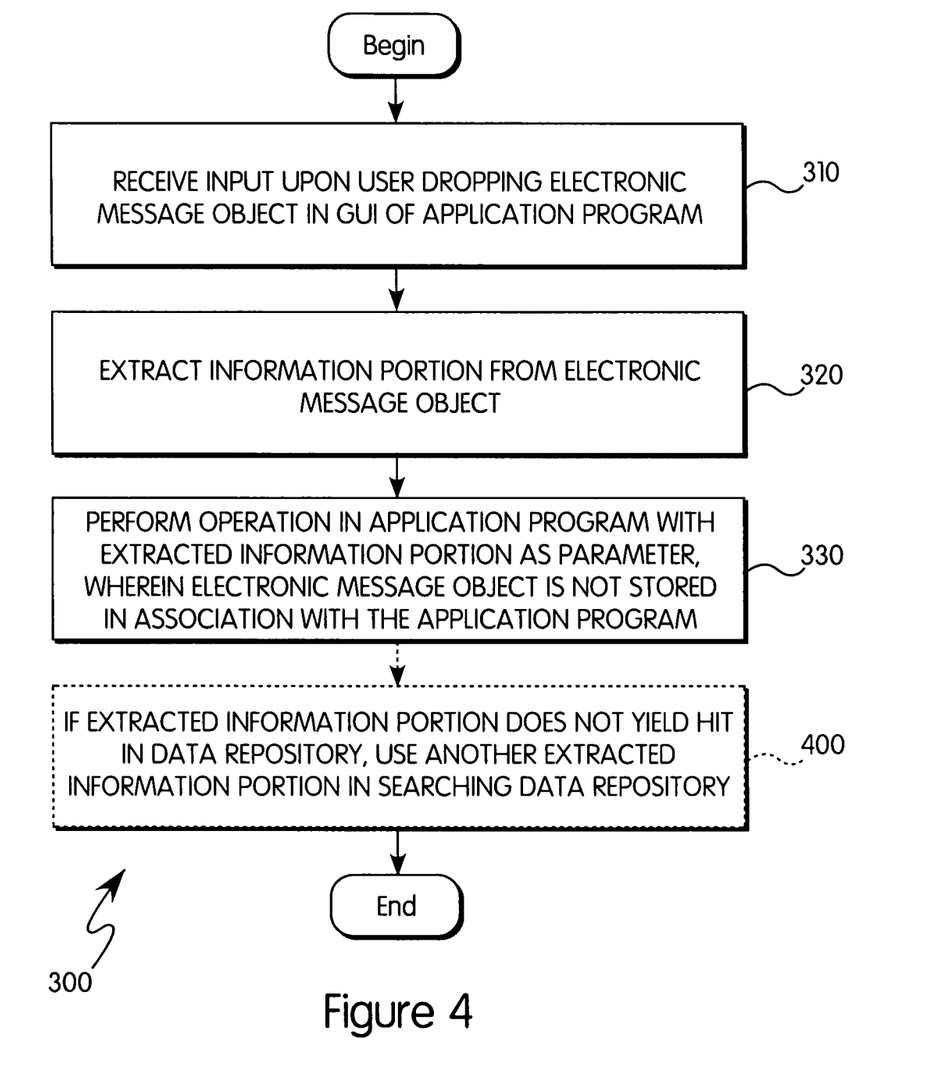
Figure 5:
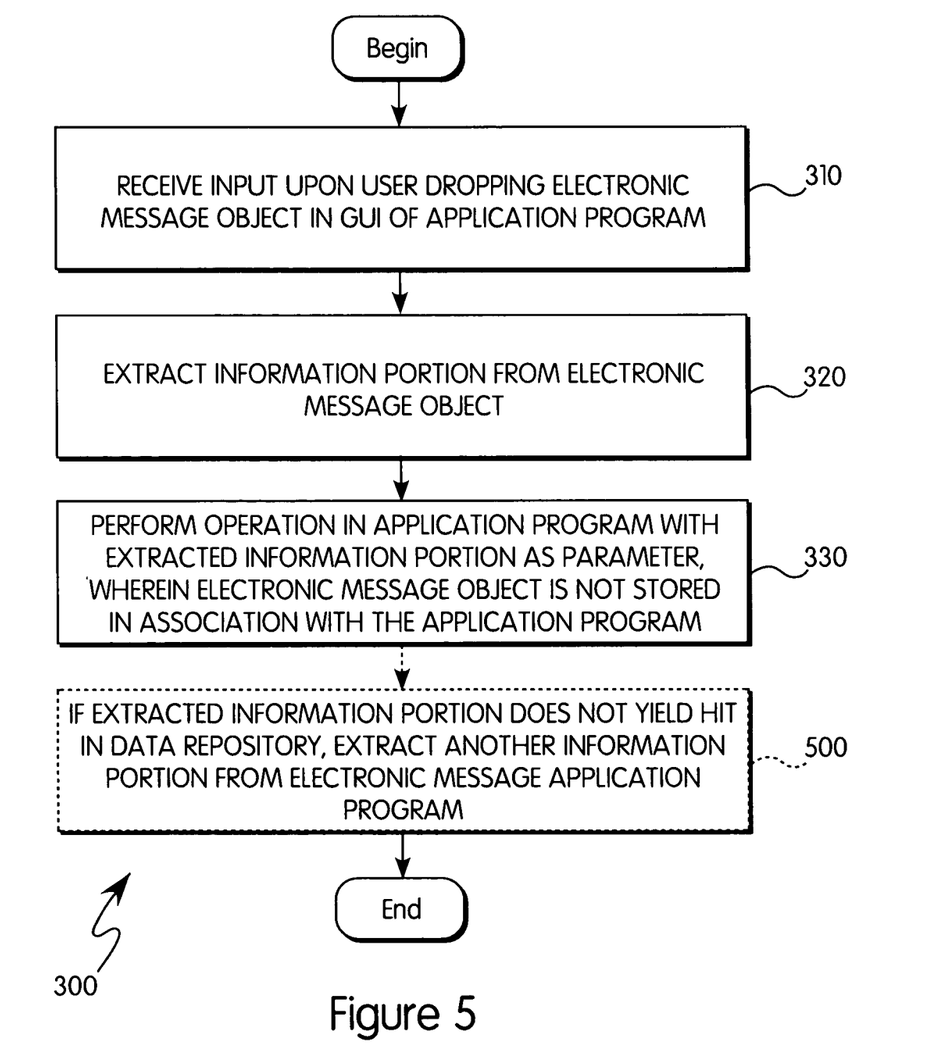

FIGS. 3-5 are flow charts of embodiments of an inventive method 300. In the FIG. 3 example, the performed operation includes a data repository search that yields several records, and the system may register which record the user selects. In FIG. 4, the data repository search yields no hit, and the system performs an additional search using another information portion extracted from the email object. Similarly to FIG. 4, the data repository search in FIG. 5 yields no hit, and the system performs an additional search using another information portion extracted from the email program. Preferably, any embodiment of the method is performed in a computer system. For example, a computer program product can include executable instructions for performing the steps of any method embodiment.

As shown in FIG. 3, method 300 may include the following steps:

Receiving, in step 310, an input in a computer system upon a user dropping an electronic message object in a GUI of an application program. For example, the input may be received upon the user dropping any of the email objects 212-218 and 234 in the application program 210. The program 210 may include one or more drop areas.

Extracting, in step 320 and upon receiving the input, an information portion from the electronic message object. For example, the sender name, sender email address, subject line content, message body content, non-displayed content and combinations thereof may be extracted.

Performing, in step 330, an operation in the application program with the extracted information portion as a parameter, wherein the electronic message object is not stored in association with the application program. For example, a search operation in a data repository may be performed. As another example, a new data repository record may be created. As yet another example, an employee record in a data repository may be updated in a given way (such as by adding a specific benefit).

Optional steps 340 and 350 relate to an implementation where the step 330 involves searching a data repository. If searching the data repository yields several records, the method 300 may comprise presenting, in optional step 340, identifiers for the several records for user selection. For example, identifiers for the records #1-4 may be presented in area 238. The user may select any of the listed records to view its contents. If the user selects one of the several records, the method 300 may comprise updating, in optional step 350, the data repository such that the selected record is identified if the extracted information portion is thereafter used in searching the data repository. For example, if the user selects the record #1, the data repository may be updated to associate the sender's email address with the selected record. The next time an email object from that sender is dropped on the program 210, the selected record may be identified using the email address.

As shown in FIG. 4, method 300 may include the following steps:

Steps 310-330 may be performed substantially as described with regard to FIG. 3.

Optional step 400 relates to an implementation where the step 330 involves searching a data repository. If the extracted information does not yield a hit in the data repository, the method 300 may comprise using, in optional step 400, another extracted information portion in searching the data repository. For example, if the sender's email address does not yield a hit, the sender's first and last name may be used for searching. The sender's first and last name in this example may be extracted from the email object in connection with extracting the sender's email address or upon determining that the email address does not yield a hit. For example, the extraction may occur in connection with step 320 or in connection with step 400.

As shown in FIG. 5, method 300 may include the following steps:

Steps 310-330 may be performed substantially as described with regard to FIG. 3.

Optional step 500 relates to an implementation where the step 330 involves searching a data repository. If the extracted information does not yield a hit in the data repository, the method 300 may comprise extracting, in optional step 500, another information portion from an electronic message application program. For example, another information portion (such as a sender's first and last name) may be extracted from the email program 200. In certain implementations, extracting the other information portion may involve using a specific interface such as MAPI. The other extracted information portion may be used in searching the data repository.

Figure 6:
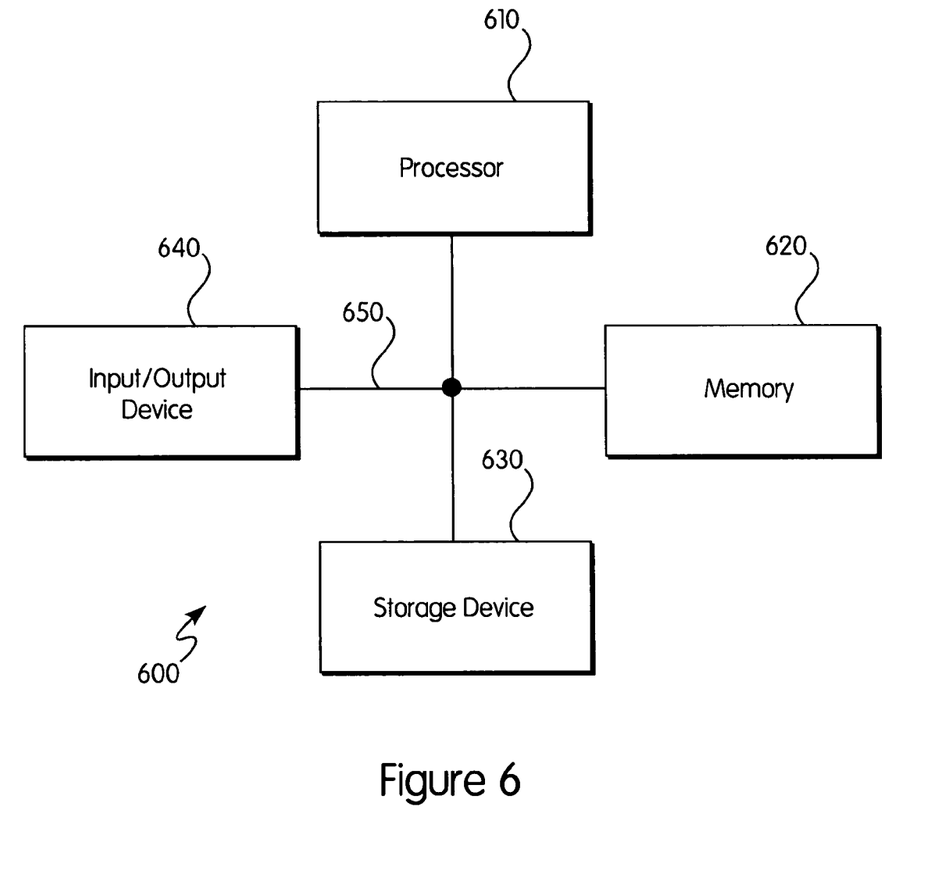
FIG. 6 is a block diagram of a general computer system.

FIG. 6 is a block diagram of a computer system 600 that can be used in the operations described above, according to one embodiment. The system 600 includes a processor 610, a memory 620, a storage device 630 and an input/output device 640. Each of the components 610, 620, 630 and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. The input/output device 640 may include a keyboard and/or pointing device. The input/output device 640 may include a display device. For example, the GUI 100 described above may be produced by the input/output device 640.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method for assisting a user, the method comprising:
   receiving an input in a computer system in response to the user dragging an electronic message object from an electronic message program and dropping the electronic message object in a graphical user interface of a business-specific application program, the electronic message program and the business-specific application program being different programs;
   extracting, upon receiving the input, an information portion from the electronic message object;
   searching, in response to the information portion, a data repository for a record by using the information portion extracted from the electronic message object as a search parameter, wherein the business-specific application program accesses one or more records in the data repository based on the search parameter; and
   outputting a result of the searching in the graphical user interface of the business-specific application program, wherein the result comprises an identifier for the record.

2. The method of claim 1, wherein the extracted information portion comprises one selected from the group consisting of: a sender name, a sender electronic message address, a recipient name, a recipient electronic message address, a subject line content of the electronic message object, a message body content of the electronic message object, a non-displayed content of the electronic message object, and combinations thereof.

3. The method of claim 1, wherein extracting the information portion comprises using a technique that searches for a character string in the electronic message object.

4. The method of claim 1, further comprising storing the extracted information portion.

5. The method of claim 1, further comprising opening the record stored in the computer system that is associated with the extracted information portion.

6. The method of claim 1, wherein searching the data repository yields several records, wherein the outputting step presents identifiers for the several records in the graphical user interface for user selection.

7. The method of claim 6, wherein the user selects the record of the several records, further comprising updating the data repository such that the record is identified if the extracted information portion is thereafter used in searching the data repository.

8. The method of claim 7, wherein the extracted information portion is a sender name of the electronic message object, and wherein updating the data repository comprises associating a sender electronic message address of the electronic message object with the record.

9. The method of claim 1, wherein the receiving is performed when the user drops the electronic message object in a drop area of the graphical user interface.

10. The method of claim 9, wherein the graphical user interface comprises several drop areas.

11. The method of claim 10, wherein at least two of the several drop areas correspond to extracting different categories of information portions from electronic message objects dropped in the at least two drop areas.

12. The method of claim 9, wherein the drop area is a visible portion of the graphical user interface where the electronic mail message can be dropped.

13. The method of claim 1, wherein the electronic message object is not stored in association with the business-specific application program.

14. A computer program product tangibly embodied on a machine-readable storage device, the computer program product including instructions that, when executed, cause a processor to perform operations comprising:
receiving an input in a computer system in response to the user dragging an electronic message object from an electronic message program and dropping the electronic message object in a graphical user interface of a business-specific application program, the electronic message program and the business-specific application program being different programs;
extracting, upon receiving the input, an information portion from the electronic message object;
searching, in response to the information portion, a data repository for a record by using the information portion extracted from the electronic message object as a search parameter, wherein the business-specific application program accesses one or more records based on the search parameter; and
outputting a result of the searching in the graphical user interface of the business-specific application program, wherein the result comprises an identifier for the record.

15. A system for processing an electronic message object comprising:
a display device for displaying a graphical user interface of a business-specific application program;
a memory device storing instructions; and
a processor executing the instructions to:
receive an input in response to the user dragging an electronic message objection from an electronic message program and dropping the electronic message object in the graphical user interface of the business-specific application program, the electronic message program and the business-specific application program being different programs;
extract, upon receiving the input, an information portion from the electronic message object;
search, in response to the information portion, for a record by using the information portion extracted from the electronic message object as a search parameter, wherein the business-specific application program accesses one or more records based on the search parameter; and
output, on the display device, a result of the searching, wherein the result comprises an identifier for the record.

16. The system of claim 15, wherein the processor executes the instructions to extract the information portion using a technique that searches for a character string in the electronic message object.

17. The system of claim 15, wherein the graphical user interface comprises a plurality of drop areas.

18. The system of claim 17, wherein at least two of the several drop areas correspond to extracting different categories of information portions from electronic message objects dropped in the at least two drop areas.

* * * * *